United States Patent
Schwaegerl et al.

(10) Patent No.: US 9,050,659 B2
(45) Date of Patent: Jun. 9, 2015

(54) DRILLING TOOL

(71) Applicant: KENNAMETAL, INC., Latrobe, PA (US)

(72) Inventors: Juergen Schwaegerl, Vohenstrauss (DE); Berthold H. Zeug, Fuerth (DE)

(73) Assignee: KENNAMETAL INC., Latrobe, PA (US)

( * ) Notice: Subject to any disclaimer, the term of this patent is extended or adjusted under 35 U.S.C. 154(b) by 220 days.

(21) Appl. No.: 13/743,536

(22) Filed: Jan. 17, 2013

(65) Prior Publication Data

US 2013/0183112 A1    Jul. 18, 2013

(30) Foreign Application Priority Data

Jan. 18, 2012   (DE) .......................... 10 2012 200 690

(51) Int. Cl.
*B23B 51/02* (2006.01)
*B23B 27/16* (2006.01)

(52) U.S. Cl.
CPC ............. *B23B 27/16* (2013.01); *Y10T 408/907* (2015.01); *Y10T 408/9098* (2015.01); *B23B 51/02* (2013.01); *B23B 2251/02* (2013.01)

(58) Field of Classification Search
USPC .......................... 408/226, 227, 230, 231, 233
See application file for complete search history.

(56) References Cited

U.S. PATENT DOCUMENTS

| | | | | |
|---|---|---|---|---|
| 5,904,455 A * | 5/1999 | Krenzer et al. | ............... | 408/144 |
| 5,957,631 A * | 9/1999 | Hecht | ............... | 408/144 |
| 6,012,881 A * | 1/2000 | Scheer | ............... | 408/227 |
| 6,481,938 B2 * | 11/2002 | Widin | ............... | 408/226 |
| 6,582,164 B1 | 6/2003 | McCormick | | |
| 7,048,480 B2 * | 5/2006 | Borschert et al. | ............. | 408/144 |
| 7,134,816 B2 * | 11/2006 | Brink | ............... | 408/226 |
| 7,311,480 B2 * | 12/2007 | Heule et al. | ............... | 408/233 |
| 7,407,350 B2 * | 8/2008 | Hecht et al. | ............... | 408/231 |
| 7,467,915 B2 * | 12/2008 | de Souza | ............... | 408/231 |
| 7,591,617 B2 * | 9/2009 | Borschert et al. | ............. | 408/226 |
| 7,740,427 B2 * | 6/2010 | Heule et al. | ............... | 408/233 |
| 7,832,967 B2 * | 11/2010 | Borschert et al. | ............. | 408/231 |
| 8,021,088 B2 * | 9/2011 | Hecht | ............... | 408/231 |
| 2008/0193237 A1 * | 8/2008 | Men et al. | ............... | 408/226 |
| 2009/0044986 A1 * | 2/2009 | Jaeger et al. | ............... | 175/418 |
| 2009/0116920 A1 * | 5/2009 | Bae | ............... | 408/227 |

(Continued)

FOREIGN PATENT DOCUMENTS

| | | |
|---|---|---|
| DE | 29809638 U1 | 9/1998 |
| WO | 98/53943 A1 | 12/1998 |
| WO | 2007/107294 A1 | 9/2007 |

*Primary Examiner* — Daniel Howell
*Assistant Examiner* — Yasir Diab
(74) *Attorney, Agent, or Firm* — Larry R. Meenan

(57) ABSTRACT

A rotary tool extends in the direction of an axis of rotation and includes a carrier having a coupling receptacle disposed at an end face, the carrier having a carrier cross section. The coupling receptacle is delimited in the entire region of the carrier cross section by an outer web having an end face forming a planar bearing area. The coupling receptacle is delimited by side walls which extend step-free from the bearing area to a bottom area and include a pair of opposing clamping segments extending in the circumferential direction and a pair of opposing torque segments arranged at an angle thereto. The tool also includes a cutting head exchangeably fastened to the carrier, the cutting head having a coupling pin disposed in the coupling receptacle. At least one of the pairs of segments is oriented inclined in relation to the axis of rotation.

17 Claims, 4 Drawing Sheets

(56) References Cited

U.S. PATENT DOCUMENTS

Figure 1:
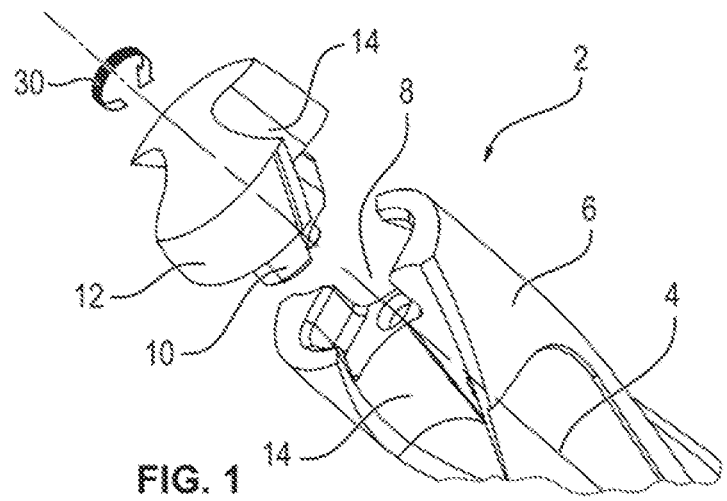

| | | | |
|---|---|---|---|
| 2009/0311060 A1* | 12/2009 | Frejd | 408/200 |
| 2010/0021253 A1* | 1/2010 | Frejd | 408/200 |
| 2010/0092259 A1* | 4/2010 | Borschert et al. | 408/230 |
| 2010/0266357 A1* | 10/2010 | Kretzschmann et al. | 408/204 |
| 2010/0322723 A1* | 12/2010 | Danielsson | 407/114 |
| 2010/0322729 A1* | 12/2010 | Pabel | 408/200 |
| 2010/0322731 A1* | 12/2010 | Aare | 408/226 |
| 2011/0097168 A1* | 4/2011 | Jager et al. | 408/200 |
| 2011/0110735 A1* | 5/2011 | Klettenheimer et al. | 408/57 |
| 2011/0110739 A1* | 5/2011 | Frisendahl | 408/200 |
| 2011/0236145 A1* | 9/2011 | Pabel et al. | 408/226 |
| 2011/0318128 A1* | 12/2011 | Schwagerl et al. | 408/200 |

* cited by examiner

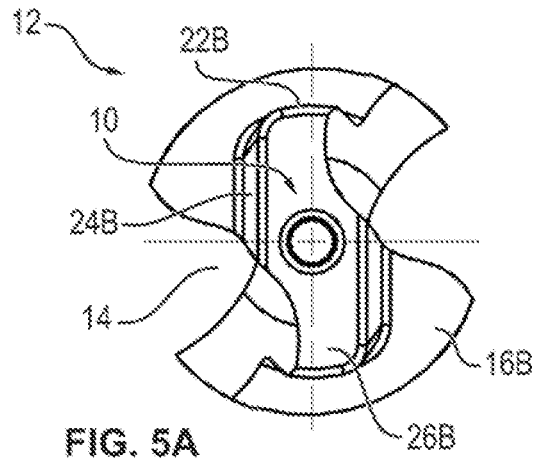
FIG. 5A
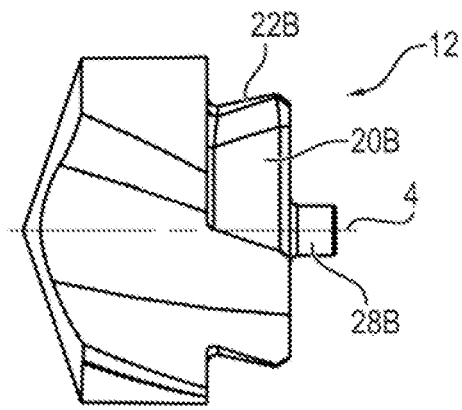
FIG. 5B
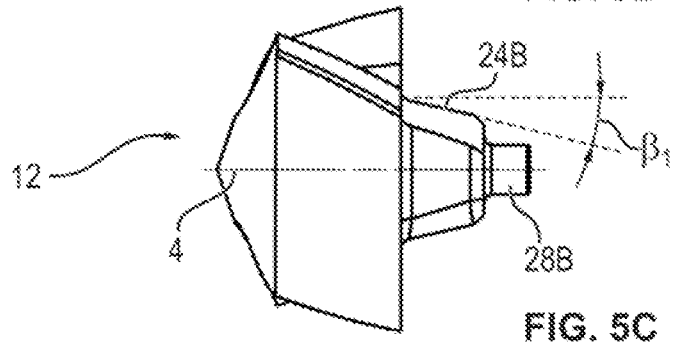
FIG. 5C
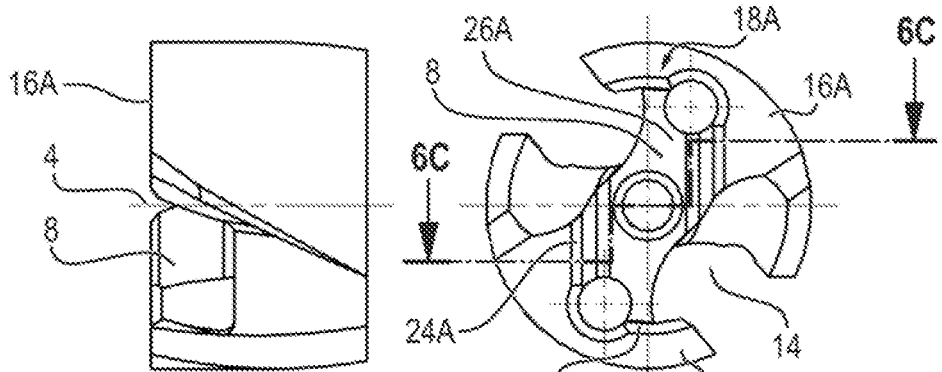
FIG. 6A
FIG. 6B
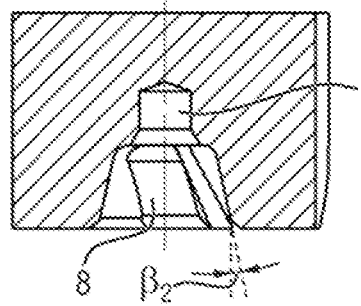
FIG. 6C

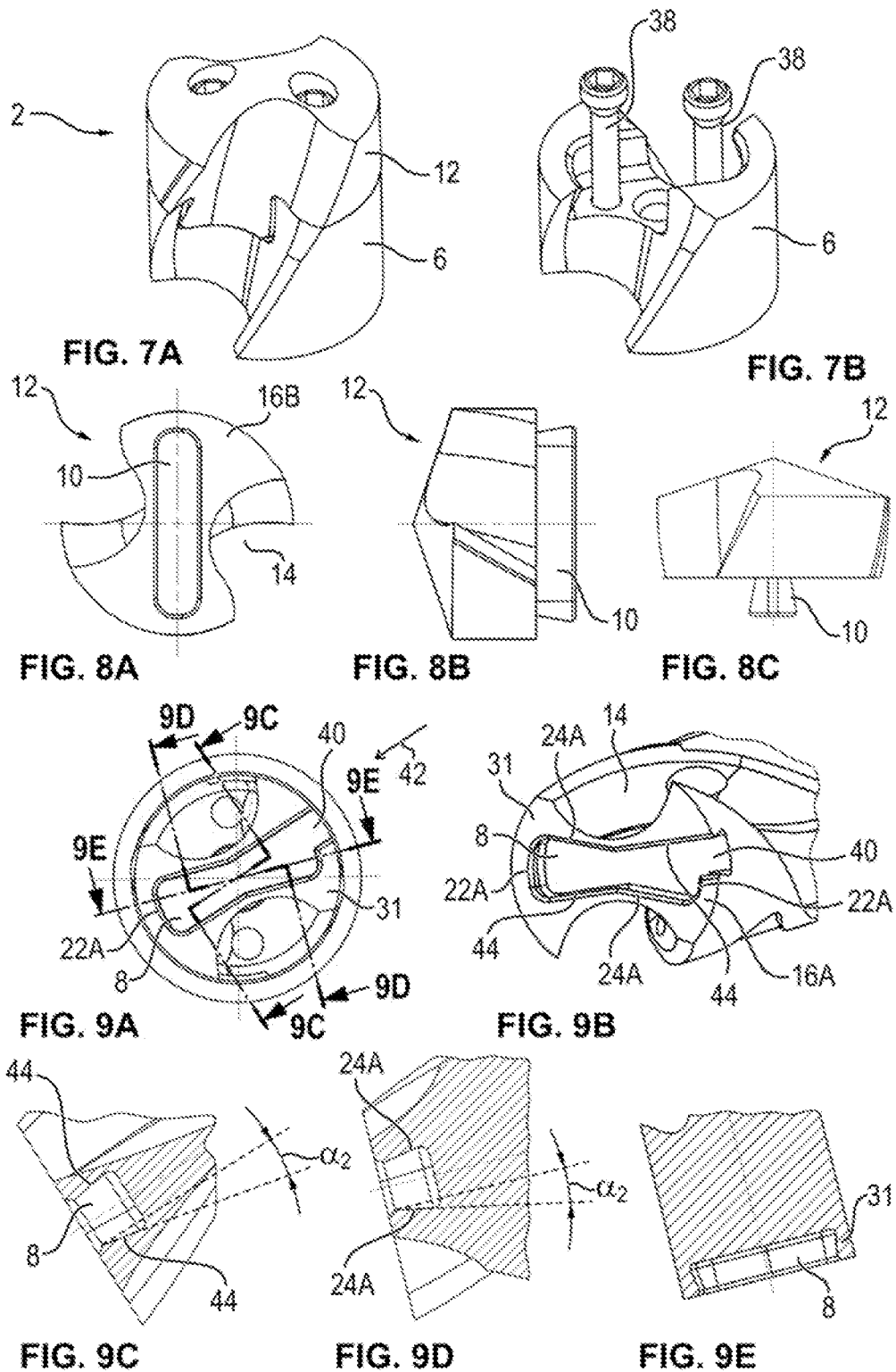

DRILLING TOOL

BACKGROUND

1. Field of the Invention

The invention relates to a rotary tool and to cutting head for use in rotary cutting tools.

2. Background Information

Tool couplings for combination tools with exchangeable cutting heads must perform several functions. Firstly, they must have sufficient axial pull-out prevention, so that the cutting head is not pulled out from the carrier during working. Problems may occur in this respect particularly during retraction of the drill when it is being withdrawn from the drilled hole. Furthermore, the tool coupling must ensure highly accurate centering of the cutting head with respect to the axis of rotation. Finally, the tool coupling must also be designed for the transmission of sometimes high torques from the carrier to the cutting head.

In the case of the tool coupling according to WO 2007/107294 A1, the coupling pin has a bone-like, asymmetric configuration and is designed as an elongate coupling pin which is completely enclosed by a web of the coupling receptacle. The asymmetric cross-sectional area designed in the manner of a bone and the enclosure by the peripheral web have the effect of making a high torque transmission possible and at the same time achieving self-centering by the widening at both ends. With regard to the axial pull-out prevention, supplementary screws are provided.

WO 1998/53943 discloses tool couplings of a further kind, in which the torque transmission areas extend radially outward. Additionally provided in the case of the tool coupling disclosed there is a central, further coupling pin, which is formed such that it is offset from the torque areas. The coupling pin is screwed into a corresponding pin receptacle during assembly, thereby forming a dovetail connection with a form fit in the axial direction.

The known coupling systems have the disadvantage that complex geometries and/or supplementary means are required to ensure the three stated main functions, axial securement, torque transfer and centering are accomplished.

In view of such disadvantages, a need exists for improved rotary tools and cutting heads therefore.

SUMMARY OF THE INVENTION

Against this background, embodiments of the present invention provide improved tool couplings in which the aforementioned three main functions are provided in an improved, simplified form.

As one aspect of the invention, a rotary tool is provided. The rotary tool comprises a carrier and a cutting head exchangeably fastened thereto, the carrier having for this purpose at the end face a coupling receptacle for a coupling pin of the cutting head and the coupling receptacle and the coupling pin being designed so as to complement one another to form a tool coupling. The coupling receptacle and the coupling pin therefore have a matching geometry, in particular the same cross-sectional geometry. The carrier has a carrier cross section, which dictates the cross-sectional regions in which there is material. Clearances on account of chip flutes therefore lead to a carrier cross section that deviates from a circular form. Preferably in the entire region of the carrier cross section, the coupling receptacle is delimited at the outer circumference of the carrier, running along a circular line, by a radially outer web. This circumferentially forms the delimitation of the carrier in the region of the coupling receptacle. The web has a front end face, which is oriented toward the cutting head and forms with its entire area a planar bearing area for the cutting head. The web itself therefore does not have any stepped graduations, etc. The front end face delimiting it lies completely within one plane. The coupling receptacle is laterally delimited respectively by side walls, which extend step-free from the bearing area to a bottom area or a base of the coupling receptacle. The side walls therefore run in a straight line, without offsets or the like being provided. Therefore, when viewed in the direction of the axis of rotation, neither the coupling receptacle nor the coupling pin has a stepped geometry, for example due to the formation of offsets.

The side walls in this case respectively have a pair of opposing clamping segments and a pair of opposing torque segments. In particular, the side walls are formed by the two pairs of segments. The clamping segments in this case extend at least substantially in the circumferential direction and serve for the radial centering of the cutting head. This means that the clamping segments exert on the assigned areas of the cutting head a radial force, directed toward the axis of rotation, so that the opposed arrangement of the clamping segments has the effect that a centering takes place. Furthermore, the torque segments are arranged at an angle to the clamping segments, in particular at an angle of approximately 90°, and serve for the torque transmission. The torque segments preferably also additionally have a centering effect on account of their opposed arrangement. The torque segments therefore also exert radial centering forces on the assigned areas of the cutting head.

Furthermore, the segments of at least one pair of segments, preferably the torque segments, are oriented such that they are obliquely inclined in relation to the axis of rotation to form an undercut acting in the axial direction, that is to say in the direction of the axis of rotation. Therefore, at least in the region of the clamping segments and/or preferably also in the region of the torque segments, a kind of dovetail connection is formed for the axial securement, the coupling pin being held in the coupling receptacle in the manner of a snug fit. For assembly, a relative movement of the coupling pin in relation to the coupling receptacle takes place, so that the mutually assigned segments of the coupling receptacle and the coupling pin are brought into engagement with one another. This takes place by a turning of the cutting head about the axis of rotation. The torque segments are therefore designed in such a way that they define both the function of the torque transmission and the function of the axial securement of the cutting head in the coupling receptacle. Apart from the clamping function, the clamping segments likewise have the function of axial securement. Preferably, both pairs of segments also serve at the same time for the radial centering by virtue of their inclined configuration. Consequently, all three functions of a tool coupling, to be specific, axial securement, torque transmission and centering, are reliably realized by the altogether step-free configuration of the tool coupling along with a simple geometry of the coupling pin and the coupling receptacle.

Usually, chip flutes are machined in the carrier. In a preferred configuration, the web is divided into a pair of opposing web segments and the torque segments are oriented in such a way that they run out into the chip flutes. The particular advantage of this variant can be seen in the fact that the web width of the web increases along the torque segment toward the chip flute, so that the web is formed very solidly, and consequently robustly, in the region of the torque segments.

The web segments preferably have in each case in the region of the clamping segments a lobe segment which runs out toward the chip flute and therefore—when there is a helical chip flute—extends partially over the chip flute, that is to say projects into the chip flute. Therefore, when viewed in the direction of the axis of rotation, the lobe segment is not completely supported by material. This design has the effect that the clamping segments have a comparatively high elasticity, and consequently form a pair of projecting clamping lobes, which exert radial forces in the manner of a pincer. When the coupling pin is inserted, a slight elastic radial widening takes place in the outward direction.

Investigations have shown that, with such a configuration, and acting together with the torque segments, extremely high axial pull-out prevention is achieved, and at the same time a secure fit of the cutting head on the bearing area is ensured. The radial "spreading" has the effect that inside the web segments forces are introduced and deflected and lead to additional radially inwardly acting force components being generated in the region of the torque segments. On account of the dovetail configuration, these additional force components generate an additional axial tightening torque, and consequently a pressing force against the bearing area.

In an expedient design, the clamping segments also extend in each case into a respective chip flute. Their arrangement substantially at right angles—the corner regions being formed by a rounded portion—has the effect that the torque segments and clamping segments define a rectangular geometry. On account of the chip flutes, diagonally opposing segments, in particular segments of a circle, have been cut out from this geometry.

The web of the coupling receptacle is therefore open toward the chip flutes, so that the cutting head can be inserted with its coupling pin into the coupling receptacle at first slightly twisted and then can be fastened therein by twisting.

As an alternative to this interruption of the web by the chip flutes, according to a preferred second configurational variant it is provided that a pushing-in aperture, through which the coupling pin can be inserted into the coupling receptacle radially along a pushing-in direction, is preferably formed only in the region of one of the two clamping segments. In the rest of the region, the web is formed all the way around the periphery, that is to say in particular is not even interrupted by the chip flutes. In the case of this configurational variant, it is rather the case therefore that the web is circumferentially interrupted in the region of the carrier cross section to form the pushing-in aperture.

Assembly takes place here by the coupling pin being led radially through the pushing-in aperture, perpendicularly in relation to the axis of rotation, and subsequently twisted within the coupling receptacle to form the dovetail connection.

It is expediently provided here that the side walls have additional guiding segments, which extend in the pushing-in direction and respectively adjoin the torque segments at a salient angle that is in particular an obtuse angle. The angle here is preferably greater than 140° and less than 180°. As a difference from the first configurational variant, in which the web segments are respectively formed by a clamping segment and a torque segment, this configurational variant therefore has an additional guiding segment, which forms a guiding function for the pushing in of the coupling pin, but is no longer in contact with it in the final assembled position with the coupling pin inserted.

In both configurational variants, the torque segments—when viewed within a cross-sectional plane perpendicular to the axis of rotation—extend in a straight line, i.e. the torque segments run parallel to a center axis that extends perpendicularly to the axis of rotation and intersecting it. The center axis is in this case also oriented in such a way that, in the region of the bottom of the receptacle, it is preferably oriented tangentially in relation to the chip flutes.

It is also advantageously provided in the case of both configurational variants that, from the clamping segments, a web width of the web increases in the region of the torque segments, in order to have sufficient material available for a torque transmission. In the case of the first configurational variant, the web width increases continuously, so that the greatest web width is at the end of the torque segment.

In a preferred configuration, the side walls are oriented such that they are inclined in relation to the axis of rotation in the entire region, i.e. both in the region of the clamping segments and in the region of the torque segments, to form an undercut acting in the axial direction.

In principle, there is the possibility of forming the side walls in the region of one of the two pairs of segments, in particular in the region of the torque segments, such that it is parallel or obliquely inclined in opposite directions in relation to the axis of rotation, in order as far as possible to avoid notch effects in the region of these segments as a result of the geometry. Inclined in opposite directions is understood here as meaning a configuration that tapers from the cutting head toward the carrier.

Altogether, the torque segments and the clamping segments preferably define an approximately rectangular basic geometry, and are therefore arranged substantially at right angles to one another.

A particular advantage of the configuration described here can be seen in that, apart from the torque segments, no further means or areas are provided for the torque transmission. As a result, altogether a simple structure is made possible. All of the torque segments therefore lie inside the coupling receptacle, that is to say do not extend radially as far as the outer circumference of the carrier. To this extent, the torque segments are enclosed by the web.

This configuration also achieves the advantage that no further centering means that exert a radially directed force on the coupling pin are provided. At most, insertion aids may be provided. Therefore, for centering there is no need for either screw elements or an additional centering pin adjoining in the axial direction, which is usually formed conically in relation to the centering, so that radial centering forces act.

In an expedient development, the coupling pin has complementing the coupling receptacle segments of the respective pairs of segments that are inclined in relation to the axis of rotation, the angle of inclination of which is different from that of the clamping segments and torque segments of the coupling receptacle. As a result, a defined mutual abutment of the segments assigned to one another is ensured.

The assigned cutting head is designed so as to complement the coupling receptacle and generally has a head cross section. The cross-sectional area in turn defines the area regions in which there is material. The coupling pin protrudes out of a plane that defines a head bearing area for bearing flat on the bearing area of the web. The coupling pin is therefore surrounded at its foot by the head bearing area. Furthermore, the coupling pin is delimited by a peripheral side wall, which extends step-free from the head bearing area as far as a planar bottom area. The side wall has in this case a pair of opposing clamping segments and a pair of opposing torque segments and is formed in particular by these pairs. The clamping segments thereby extend at least substantially in the circumferential direction and serve for the radial centering of the cutting head; the torque segments are arranged at an angle, in particular approximately at a right angle, thereto and serve for the torque transmission. The side wall of at least one of the pairs of segments, preferably both pairs of segments, is also oriented such that it is inclined in relation to the axis of rotation to form a dovetail undercut.

The torque segments and preferably also in addition the clamping segments expediently open out into chip flutes, the torque segments and preferably also the clamping segments extending in a straight line.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING FIGURES

Figure 2A:
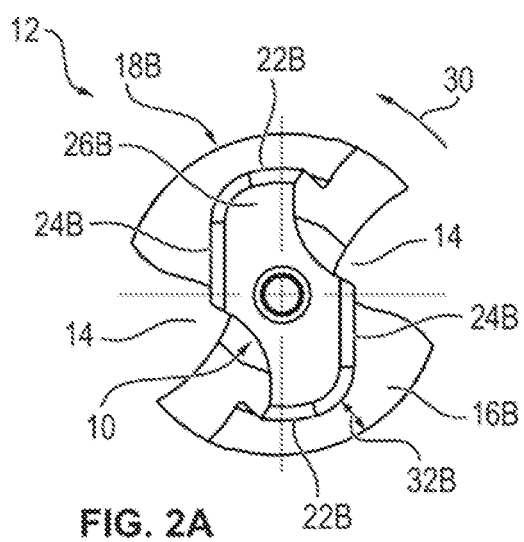
Figure 2B:
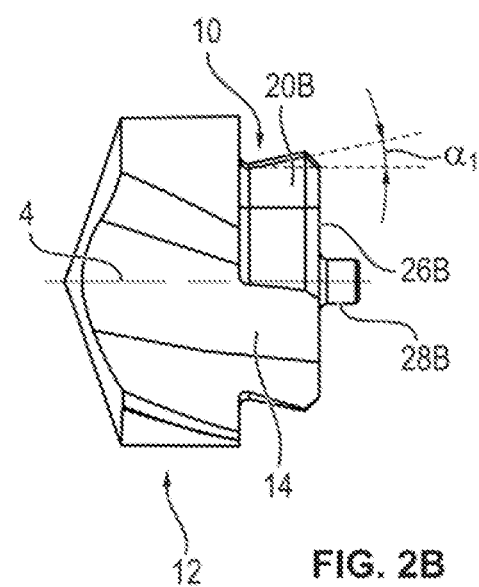
Figure 2C:
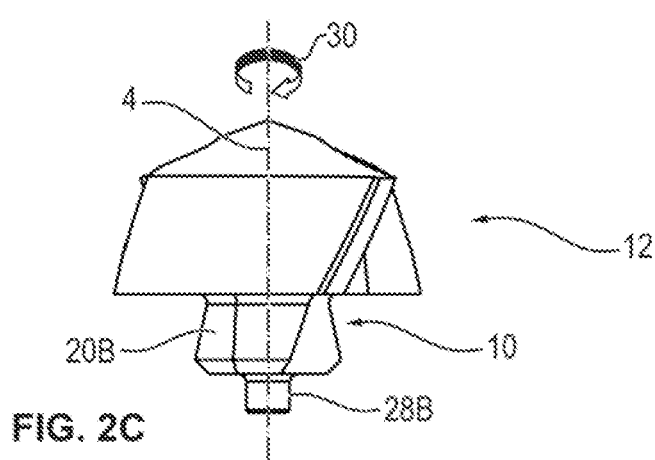
Figure 3A:
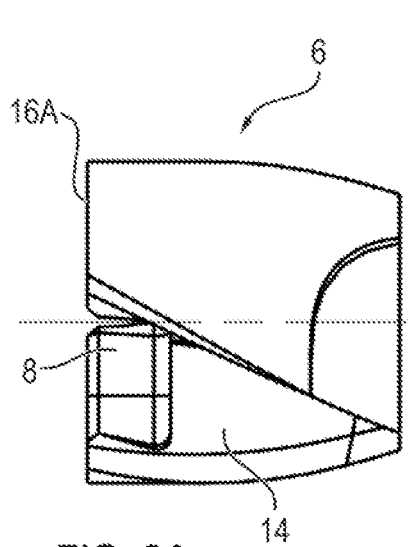
Figure 3B:
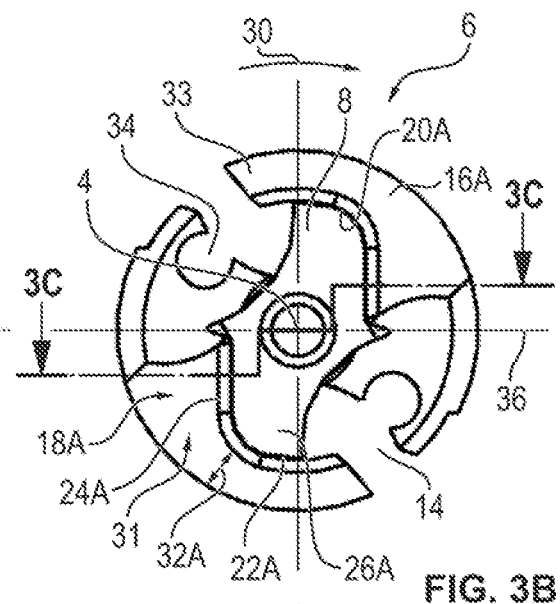
Figure 3C:
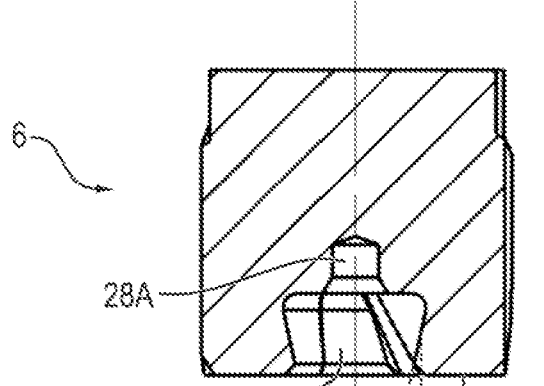
Figure 4A:
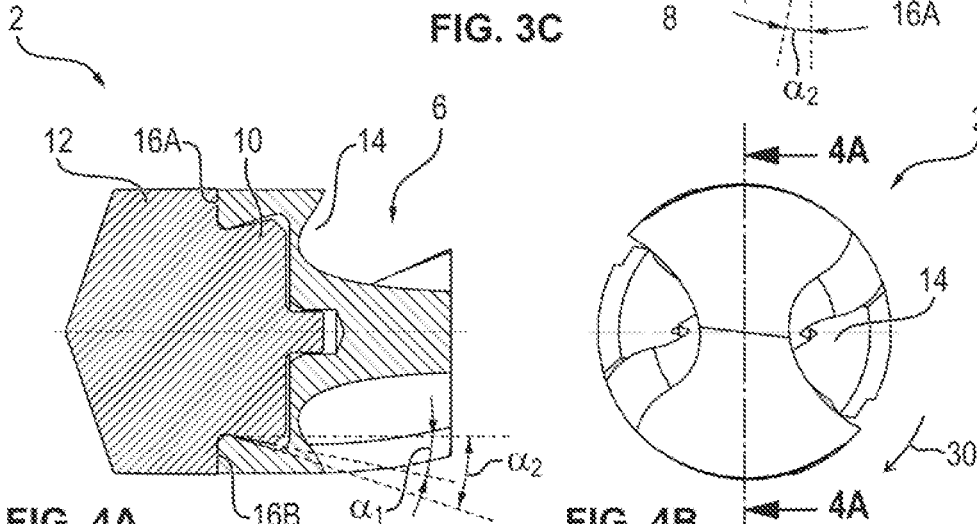
Figure 4B:
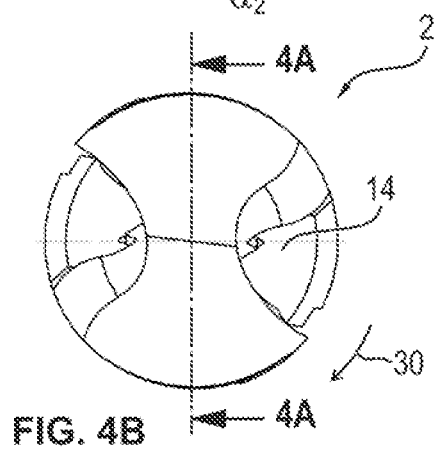

Novel features and characteristics of the disclosure are set forth in the appended claims. The disclosure itself, however, as well as an example mode of use, further objectives and advantages thereof will best be understood by reference to the following detailed description of an illustrative embodiment when read in conjunction with the accompanying figures. One or more embodiments are now described, by way of example only, with reference to the accompanying figures wherein like reference numerals represent like elements and in which:

FIG. 1 shows a perspective exploded representation of a detail of a rotary tool with a carrier and a cutting head according to a first configurational variant, FIG. 2A shows a plan view of the underside of the cutting head according to the first configurational variant, FIG. 2B shows a side view of the cutting head according to FIG. 2A, FIG. 2C shows a side view turned through 90° of the cutting head according to FIG. 2B, FIG. 3A shows a side view of a detail of the carrier according to the first configurational variant, FIG. 3B shows a plan view of the front end face of the carrier according to FIG. 3A, FIG. 3C shows a sectional view according to the sectional line 3C-3C in FIG. 3B, FIG. 4A shows a sectional representation of a detail in the region of the cutting head according to the first configurational variant along the sectional line 4A-4A in FIG. 4B, which shows an end-on view of the rotary tool, FIGS. 5A-C show in relation to the views of FIGS. 2A-2C corresponding views of a cutting head according to a second configurational variant, FIGS. 6A-C show in relation to FIGS. 3A-3C corresponding views of the carrier according to the second configurational variant, FIGS. 7A and B show a perspective representation of a detail in the region of the cutting head of a third configurational variant with an additional axial screw securement, FIGS. 8A-C show in relation to the views of FIGS. 2A-2C corresponding views of a cutting head according to a fourth configurational variant, FIGS. 9A and B show a plan view and a perspective view of a carrier of the fourth configurational variant, FIG. 9C shows a sectional representation along the line 9C-9C in FIG. 9A, FIG. 9D shows a sectional representation along the line 9D-9D in FIG. 9A, and FIG. 9E shows a sectional representation along the line 9E-9E in FIG. 9A.

The figures depict embodiments of the disclosure for purposes of illustration only. One skilled in the art will readily recognize from the following description that alternative embodiments of the structures and methods illustrated herein may be employed without departing from the principles of the disclosure described herein.

DESCRIPTION OF EXEMPLARY EMBODIMENTS

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present disclosure.

In the exemplary embodiments, parts acting in the same way are provided with the same reference signs.

The rotary tool 2, a detail of which in shown in FIG. 1, is designed in the exemplary embodiment as a modular drilling tool. It comprises a carrier 6, which extends in the direction of an axis of rotation 4 and on the front end face of which there is formed a coupling receptacle 8, into which a coupling pin 10 of a cutting head 12 can be inserted at the end—and can be fastened. In the exemplary embodiment, the rotary tool 2 has two helical chip flutes 14, which are machined in the body of the carrier 6 and are continued in the cutting head 12, in particular in such a way that the chip flute walls are in line from the carrier 6 to the cutting head 12 without any edges.

The carrier 6 generally has a front cutting region with the chip flutes 14 and a rearward clamping shank adjoining thereto, which is not represented any more specifically here and with which it can be clamped in a tool receptacle of a corresponding machine tool.

The end face of the carrier 6 and the rearward end face of the cutting head are designed so as to complement one another to form a tool coupling. Hereafter, the elements of the tool coupling on the carrier side are respectively provided with the reference symbol "A" and those on the head side are provided with the reference symbol "B".

The structure of the cutting head 12 according to a first configurational variant is now explained in more detail on the basis of FIG. 2A-2C. The coupling pin 10 extends in the direction of the axis of rotation 4 from a planar head bearing area 16B, by which it is peripherally enclosed and delimited at its foot. It has a head cross-sectional area 18B, which is defined by that cross-sectional area perpendicular to the axis of rotation 4 in which there is material. In the exemplary embodiment, the head cross-sectional area 18B is therefore formed by a circular cross section less the clearances due to the chip flutes 14.

In the entire region of the head bearing area 16B, the cutting head 12 is taken further forward, and therefore has a certain head height, before the actual drill tip is formed, with for example a cone-shaped ground surface.

The coupling pin 10 is delimited peripherally by a side wall 20B, which is formed by in each case two opposing pairs of clamping segments 22B and torque segments 24B. The two segments 22B, 24B go over into one another, respectively to form a rounded portion. The opposing clamping segments 22B and the torque segments 24B respectively run parallel to one another. The segments 22B, 24B run in each case into a respective chip flute 14. The segments 22B, 24B are oriented approximately at right angles in relation to one another, so that they approximately define a rectangular basic geometry. At the extreme lower end of the coupling pin 10, the latter is defined by a planar bottom area 26B, from which just a cylindrical insertion pin 28B protrudes centrally. This insertion pin 28B merely serves as an insertion aid when the cutting head 12 is being assembled into the coupling receptacle 8. Its diameter is only approximately 10% to 15% of a nominal drill diameter.

In the case of the preferred first configurational variant represented in FIGS. 2A-2C, both the clamping segments 22B and the torque segments 24B are oriented such that they are obliquely inclined in relation to the axis of rotation 4 at an angle of inclination $\alpha_1$, which lies for example in the range between 10° and 20°. The coupling pin 10 is therefore altogether approximately conically formed and tapers in the direction of the drill tip.

In the transitional region from the coupling pin 10 to the head bearing area 16B or the bottom area 26B, rounded portions or bevels are respectively formed, in order in particular to reduce notching forces at the transition to the head bearing area 16B and make easy insertion into the coupling receptacle 8 possible.

As can be seen in particular from the plan view according to FIG. 2A, the respective clamping segment 22B runs approximately in the circumferential direction 30. The circumferential direction 30 is in this case opposite to the direction of rotation of the rotary tool, that is to say the turning direction of the rotary tool 2 when it is being used as intended. When the cutting head 12 is viewed from the front, the direction of rotation is usually counterclockwise.

In the region of the torque segments 24B, a width 32B of the head bearing area 16B increases continuously from the respective clamping segment 22B. The width 32B is in this case defined by the radial distance between the circumferential area of the cutting head 12 and the side wall 20B.

The front end region of the carrier 6, which is represented in FIGS. 3A-3C, is designed so as to complement the cutting head 12. The side views according to FIGS. 3A and 3C respectively show only pieces of the carrier 6. Corresponding to the individual elements of the cutting head 12, the carrier 6 has a planar bearing area 16A, a carrier cross section 18A, side walls 20A, clamping segments 22A, torque segments 24A, a bottom area 26A, an insertion bore 28A, and also a web width 32A. In the plan view according to FIG. 3B, coolant outlets 34 can also be additionally seen in the chip flutes 14. On account of the representation chosen, whereby the carrier 6 has been cut off, these outlets are represented as an open circular area.

As can be seen in particular from FIG. 3B, the clamping segments 22A extend parallel to a center axis 36, which crosses the axis of rotation 4 at right angles and—at the level of the bottom area 26A—forms a tangent to the wall areas of the chip flutes 14.

The clamping segments 22A and the torque segments 24A are inclined at an angle of inclination $\alpha_2$ in relation to the axis of rotation, where $\alpha_2$ is somewhat greater than $\alpha_1$—as can be seen in particular from FIG. 4A. The difference between these two angles lies for example in the range from 0.1° to 2.5°.

The situation in the joined-together state can be seen from FIG. 4A. The cutting head is resting with its head bearing area 16B flat and fully circumferentially on the bearing area 16A. The obliquely inclined segments 22A, B and 24A, B have the effect that the cutting head 12 is held in the carrier 6 in the manner of a dovetail connection.

For the assembly of the cutting head 12, it is inserted with its coupling pin 10 ahead into the coupling receptacle 8, the coupling pin 10 at first being twisted slightly with respect to the coupling receptacle 8, until the two bearing areas 16A, B are lying one on the other. Subsequently, the cutting head 12 is twisted in the circumferential direction 30, so that the obliquely inclined segments 22A, B and 24A, B form the dovetail undercut. The circumferential direction 30 therefore corresponds to a screwing-in direction, in the direction of which the cutting head 12 is screwed into the carrier 6 during assembly.

As can be seen in particular from the plan view according to FIG. 3B, the receptacle 8 is enclosed in the entire region of the carrier cross section 18A (circular cross section less the clearances due to the chip flutes 14), to be precise level with the bearing area 16A, by a web 31, so that all of the segments 22A, 24A lie centrally inside and are not led radially to the outside. This applies in particular to the torque segments 24A. It can also be seen that the web width 32A widens continuously in the circumferential direction 30.

In the region of the clamping segment 22A, the web 31 respectively goes over into the chip flute 14, to this extent protrudes and, in this projecting region, is no longer completely supported by material in the direction of the axis of rotation. This projecting region is referred to as a lobe segment 33.

During the screwing in of the coupling pin 10, the opposing lobe segments 33 are widened somewhat elastically, so that they exert a radial force component on the coupling pin 10.

With the configuration chosen, the special orientation of the torque segments 24A, and in particular their configuration to form a dovetail undercut, can be seen as a particular advantage. In the region of the clamping segments 22B, the coupling pin 10 generates a radially outwardly acting force, which, by deflection within the web 31, conversely generates a radially inwardly acting force in the torque segments 24A. The dovetail-like configuration thereby has the effect that a supplementary tightening torque is additionally exerted in the axial direction, so that the head bearing area 16B is pressed against the bearing area 16A. In addition, this has the effect that the centering action is also improved in the region of the torque segments 24B.

In spite of the intensity of the transmitted torque forces in the region of the torque segments 24B, the obliquely inclined configuration is therefore of advantage for forming the dovetail undercut also in the region of the torque segments. This more than compensates for a notch effect possibly induced by this oblique position in the transitional region from the side wall 20B of the coupling pin 10 into the head bearing area 16B. To this extent, the first configurational variant, represented in FIGS. 1-4, is the preferred variant.

In the case of the second configurational variant, as it is represented in FIGS. 5 and 6, as a difference from the first configurational variant there is no dovetail undercut in the region of the torque segments 24B. Rather, in the exemplary embodiment of variant 2, they are inclined in opposite directions at an angle of inclination $\beta_1$, $\beta_2$, so that the torque segments 24A, 24B taper conically in the direction of the axis of rotation 4 toward the carrier 6. Otherwise, the configurational variant according to FIGS. 5 and 6 is identical to the configurational variant according to FIGS. 1 to 4.

In the case of both configurational variants, reliable axial pull-out prevention, sufficient torque transmission and a centering function are realized altogether by the comparatively simply formed coupling pin 10 and the coupling receptacle 8 comprising only one element. It should be emphasized here that both the coupling pin 10 and the coupling receptacle 8 have for these three functions a simple, substantially rectangular basic cross-sectional area and that there are no offsets or stepped graduations in the direction of the axis of rotation. No offsets or stepped graduations are provided in the circumferential direction either. Only in the central region is there the adjoining insertion pin 28B, which however has no effect with regard to the three functions mentioned; in particular, it also does not undertake any centering function in the sense of highly accurate centering, which is only made possible by the action of radial forces on the coupling pin 10. Correspondingly, the insertion pin 28B is therefore also provided with cylindrical side areas, which run parallel to the axis of rotation 4.

The basic geometry of the tool coupling can therefore be generally described for instance by an approximately cuboidal main body element, in which the side walls are formed such that they are obliquely inclined. The main body is therefore formed altogether in the manner of a truncated pyramid, with a rectangular base area and a cross-sectional area perpendicular to the base area that is formed by a preferably symmetrical trapezoid. This main body (both on the coupling receptacle 8 side and on the coupling pin 10 side) respectively extends from a planar area 16B, A and ends in turn at a planar area 26A, B. This cuboidal basic geometry is enclosed by the web 31, apart from the region in which the chip flutes 14 are formed, which to this extent cut out cylindrical or elliptical segments from the cuboidal geometry.

In principle, this tool coupling also has the advantage that the axial pull-out prevention is sufficient without further additional axial fastening means. This applies in particular in the case of relatively small nominal diameters of the carrier 6, for example down to 25 mm. This avoids in particular that there is any further weakening of the carrier core. This problem is less relevant in the case of larger diameters. To this extent, with larger nominal diameters greater than 20 or 25 mm, screws 38 may be additionally provided for the axial pull-out prevention, as is represented in the third exemplary embodiment of FIGS. 7A, 7B.

A further, fourth configurational variant is represented in FIGS. 8A-8C and FIGS. 9A-9E. As a difference from the previous exemplary embodiments, the longitudinal direction (running transversely in relation to the axis of rotation) of the coupling pin 10 and of the coupling receptacle 8 no longer extends from chip flute 14 to chip flute 14, but runs substantially between these chip flutes, so that therefore neither the coupling pin 10 nor the coupling receptacle 8 opens out into the chip flute. Rather, the coupling receptacle 8 is enclosed virtually completely by the web 31, and only in the region of one of the two clamping segments 22B is there formed a pushing-in aperture 40; therefore the web 31 is interrupted.

The width of this pushing-in aperture 40 corresponds in this case to the width of the coupling pin 10, so that this makes it possible for the coupling pin 10 to be pushed into the coupling receptacle 8 perpendicularly in relation to the axis of rotation 4 in a pushing-in direction 42, which corresponds approximately to the longitudinal direction of the coupling receptacle 8. Provided for this purpose is a pair of guiding segments 44, along which the coupling pin 10 slides and is guided during the pushing in. Subsequent twisting has the effect in turn that the dovetail undercut is formed between the clamping segments 22A, 22B and/or between the torque segments 24A, 24B. As represented in the exemplary embodiment, the dovetail undercut is formed in the case of all the segments 22A, B, 24A, B.

Also in the case of this configurational variant, all three functions, to be specific axial pull-out prevention, centering effect and torque transfer, are assumed just by the approximately frustopyramidal coupling pin 10 and the correspondingly formed coupling receptacle 8. Further fastening means for axial pull-out prevention or centering means for centering are not required. In comparison with the coupling pins 10 according to the previous exemplary embodiments, the coupling pin 10 is also of a simplified design, since the chip flutes 14 do not cut out a region. The coupling pin 10 is therefore formed as a simple truncated pyramid with rounded corners. In the case of this exemplary embodiment, the coupling receptacle 8 is preferably dimensioned such that insertion of the coupling pin 10 in the direction of the axis of rotation 4 is not possible.

According to an alternative configurational variant that is not represented any more specifically, the width of the coupling receptacle 8 is dimensioned such that insertion of the coupling pin 10 in the direction of the axis of rotation 4 is made possible. In the case of this variant, there is preferably no pushing-in aperture.

While various aspects and embodiments have been disclosed herein, other aspects and embodiments will be apparent to those skilled in the art. The various aspects and embodiments disclosed herein are for purposes of illustration and are not intended to be limiting.

The invention claimed is:

1. A rotary tool which extends in the direction of an axis of rotation, the rotary tool comprising:
   a carrier having a coupling receptacle disposed at an end face; the carrier having a carrier cross section, the coupling receptacle being delimited by an outer web having an end face forming a planar bearing area, the coupling receptacle being delimited by side walls extending step-free from the bearing area to a bottom area; and
   a cutting head exchangeably fastened to the carrier at the end face, the cutting head having a coupling pin disposed in the coupling receptacle,
   wherein:
      the coupling pin extends in the direction of the axis of rotation from a planar head bearing area which abuts the planar bearing area of the carrier,
      the side walls have a pair of opposing clamping segments and a pair of opposing torque segments,
      the clamping segments extend in the circumferential direction and serve for the radial centering of the cutting head,
      the torque segments are arranged at an angle to the clamping segments and serve for the torque transmission, and
      at least one of the pairs of segments is oriented such that it is inclined in relation to the axis of rotation to form an undercut for axial pull-out prevention.

2. The rotary tool of claim 1 wherein the carrier comprises chip flutes, which divide the web and wherein each of the torque segments end in a respective one of the chip flutes.

3. The rotary tool of claim 2 wherein the web has in each case in the region of the clamping segments a lobe segment, which ends at the chip flute and—when viewed in the direction of the axis of rotation—extends over the chip flute.

4. The rotary tool of claim 1 wherein the web is formed around the periphery and has a pushing-in aperture defined therethrough only in the region of one of the two clamping segments, via which the coupling pin can be inserted into the coupling receptacle radially along a pushing-in direction.

5. The rotary tool of claim 4 wherein the side walls additionally have guiding segments which generally extend in the pushing-in direction.

6. The rotary tool of claim 1 wherein each of the torque segments—in a sectional plane perpendicular to the axis of rotation—extend in its own straight line.

7. The rotary tool of claim 1 wherein, from the clamping segments, a web width of the web increases in the region of the torque segments.

8. The rotary tool of claim 1 wherein each of the side walls are oriented such that they are inclined in relation to the axis of rotation in the entire region to form the undercut.

9. The rotary tool of claim 1 wherein the torque segments are oriented at right angles to the clamping segments.

10. The rotary tool of claim 1 wherein apart from the pair of torque segments, no further mechanisms or areas are provided for the torque transmission.

11. The rotary tool of claim 1 wherein apart from the clamping segments and the torque segments, no further centering means that exert a radially acting force on the coupling pin are provided.

12. The rotary tool of claim 1 wherein the coupling pin has, complementing the coupling receptacle, pairs of torque segments and clamping segments that are inclined in relation to the axis of rotation, the angle of inclination of which is different from that of the pairs of torque segments and clamping segments of the coupling receptacle.

13. A cutting head for use with a carrier in a rotary tool rotatable about a central axis, the cutting head comprising:
   a main portion having a head cross section;
   a head bearing area disposed on the main portion and structured to bear flat on a bearing area of the carrier; and
   a coupling pin extending from the head bearing area about the axis of rotation,
   wherein:
      the coupling pin is delimited by a side wall which extends step-free from the head bearing area to a bottom area,
      the side wall has a pair of opposing clamping segments and a pair of opposing torque segments,
      the clamping segments extend in the circumferential direction and serve for the radial centering,
      the torque segments are arranged at an angle thereto and serve for the torque transmission, and
      at least one of the pairs of segments is oriented such that it is inclined in relation to the axis of rotation to form an undercut for axial pull-out prevention.

14. The cutting head of claim 13 further comprising chip flutes into which each of the torque segments respectively end.

15. The cutting head of claim 13 wherein each of the torque segments extend in its own straight line.

16. The cutting head of claim 13 wherein the clamping segments and the torque segments are oriented away from the central axis.

17. The rotary tool of claim 1 wherein the clamping segments and the torque segments are oriented toward the coupling receptacle.

* * * * *